United States Patent
Zhang et al.

(10) Patent No.: US 11,822,003 B2
(45) Date of Patent: Nov. 21, 2023

(54) METHODS AND SYSTEMS FOR ADJUSTING RADAR PARAMETERS BASED ON CONGESTION MEASUREMENTS

(71) Applicant: QUALCOMM Incorporated, San Diego, CA (US)

(72) Inventors: Dan Zhang, San Diego, CA (US); Ahmed Bedewy, San Diego, CA (US); Kapil Gulati, Belle Mead, NJ (US); Junyi Li, Chester, NJ (US)

(73) Assignee: QUALCOMM INCORPORATED, San Diego, CA (US)

( * ) Notice: Subject to any disclaimer, the term of this patent is extended or adjusted under 35 U.S.C. 154(b) by 331 days.

(21) Appl. No.: 17/189,066

(22) Filed: Mar. 1, 2021

(65) Prior Publication Data
US 2022/0276336 A1    Sep. 1, 2022

(51) Int. Cl.
*G01S 7/02* (2006.01)
*G01S 7/00* (2006.01)
*G01S 13/931* (2020.01)

(52) U.S. Cl.
CPC ............. *G01S 7/023* (2013.01); *G01S 7/003* (2013.01); *G01S 7/021* (2013.01); *G01S 13/931* (2013.01); *G01S 2013/9316* (2020.01)

(58) Field of Classification Search
CPC ........ G01S 7/023–7/0236; G01S 7/003; G01S 7/021; G01S 13/931; G01S 2013/9316
See application file for complete search history.

(56) References Cited

U.S. PATENT DOCUMENTS

| | | | |
|---|---|---|---|
| 7,683,827 B2* | 3/2010 | Kelly, Jr. ................ | G01S 7/36 342/159 |
| 8,223,064 B2* | 7/2012 | Szajnowski ............ | G01S 13/34 342/159 |
| 8,471,760 B2* | 6/2013 | Szajnowski ............ | G01S 7/023 342/107 |
| 9,689,967 B1* | 6/2017 | Stark ..................... | G01S 7/0233 |
| 10,698,082 B2* | 6/2020 | McCloskey ............ | G01S 7/0232 |
| 11,385,321 B2* | 7/2022 | Lin ........................ | H01Q 3/36 |
| 2004/0027268 A1* | 2/2004 | Langsford ............. | G01S 7/2813 342/39 |
| 2004/0066323 A1* | 4/2004 | Richter .................. | G01S 7/40 342/159 |
| 2007/0120731 A1* | 5/2007 | Kelly, Jr. ................ | G01S 7/36 342/159 |
| 2010/0019950 A1* | 1/2010 | Yamano ................. | G01S 7/352 342/104 |
| 2010/0302969 A1* | 12/2010 | Duenyas ............ | H04W 72/541 370/252 |

(Continued)

OTHER PUBLICATIONS

International Search Report and Written Opinion—PCT/US2022/015410—ISA/EPO—dated May 17, 2022.

*Primary Examiner* — Peter M Bythrow
(74) *Attorney, Agent, or Firm* — Haynes and Boone, LLP/Qualcomm Incorporated

(57) ABSTRACT

Systems and methods for adjusting radar transmission parameters based on congestion level measurements are disclosed. In some aspects, a congestion level of radar signals at a location in a vicinity of a radar source may be measured or otherwise determined. In some aspects, a transmission parameter of radar signals configured for transmission to the location by the radar source may be adjusted based on the congestion levels.

30 Claims, 7 Drawing Sheets

(56) References Cited

U.S. PATENT DOCUMENTS

| | | | |
|---|---|---|---|
| 2015/0378005 A1* | 12/2015 | Kojima | G01S 7/282 |
| | | | 342/16 |
| 2017/0219689 A1* | 8/2017 | Hung | G01S 7/0232 |
| 2018/0149730 A1* | 5/2018 | Li | G01S 7/0234 |
| 2019/0056476 A1* | 2/2019 | Lin | G01S 7/023 |
| 2019/0072641 A1* | 3/2019 | Al-Stouhi | G01S 13/931 |
| 2020/0393536 A1* | 12/2020 | Stettiner | G01S 13/343 |
| 2021/0063566 A1* | 3/2021 | Smith | G06V 20/58 |
| 2021/0190901 A1* | 6/2021 | Izadian | G01S 7/0235 |
| 2022/0116886 A1* | 4/2022 | Manolakos | G01S 7/003 |
| 2022/0326345 A1* | 10/2022 | Wang | G01S 7/0236 |
| 2022/0390550 A1* | 12/2022 | Markel | G01S 7/023 |
| 2022/0390583 A1* | 12/2022 | Himmelstoss | G01S 13/60 |

\* cited by examiner

METHODS AND SYSTEMS FOR ADJUSTING RADAR PARAMETERS BASED ON CONGESTION MEASUREMENTS

INTRODUCTION

Modern motor vehicles are increasingly incorporating technology that helps drivers avoid drifting into adjacent lanes or making unsafe lane changes (e.g., lane departure warning (LDW)), or that warns drivers of other vehicles behind them when they are backing up, or that brakes automatically if a vehicle ahead of them stops or slows suddenly (e.g., forward collision warning (FCW)), among other things. The continuing evolution of automotive technology aims to deliver even greater safety benefits, and ultimately deliver automated driving systems (ADS) that can handle the entire task of driving without the need for user intervention. Such technology, in most cases, includes radar detection of other vehicles, pedestrians, objects, etc. that are in the vicinity of the vehicle equipped with the technology.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Some aspects of the present disclosure disclose a method comprising transmitting first radar signals. In some aspects, the method further comprises receiving, from one or more second radar sources, second radar signals and/or radar signal congestion data related to the one or more second radar sources. Further, the method comprises transmitting third radar signals, wherein at least one transmission parameter of the third radar signals has a value different from that of a corresponding at least one transmission parameter of the first radar signals based on a first congestion level in a vicinity of the first radar source.

Some aspects of the present disclosure disclose an apparatus comprising a transceiver configured to transmit first radar signals. In some aspects, the transceiver is further configured to receive, from one or more second radar sources, second radar signals and/or radar signal congestion data related to the one or more second radar sources. Further, the transceiver is configured to transmit third radar signals, wherein at least one transmission parameter of the third radar signals has a value different from that of a corresponding at least one transmission parameter of the first radar signals based on a first congestion level in a vicinity of the first radar source.

Some aspects of the present disclosure disclose a non-transitory computer-readable medium having program code recorded thereon. In some aspects, the program code can include code for causing a transceiver, associated with a first radar source, to transmit first radar signals. Further, the program code can include code for causing the transceiver to receive, from one or more second radar sources, second radar signals and/or radar signal congestion data related to the one or more second radar sources. In addition, the program code can include code for causing the transceiver to transmit third radar signals, wherein at least one transmission parameter of the third radar signals has a value different from that of a corresponding at least one transmission parameter of the first radar signals based on a first congestion level in a vicinity of the first radar source.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

In some aspects, a first radar source may use a radar system to track and/or detect a target in the presence of one or more other radar sources. The presence of the other radar sources, however, may interfere with the detection and/or tracking of targets by the first radar source, because the interference may make it difficult for the first radar source to distinguish radar signals from various radar sources. For example, the interference may give rise to the detection of so-called ghost targets (i.e., false targets) where the real sources of signals appear shifted in position (e.g., closer) to the first radar and the signals with higher power. In some cases, such difficulty may be due to the fact that a beat frequency, calculated based at least in part on a difference between instantaneous frequencies of the transmitted signal and a received interference signal, may be indistinguishable from a beat frequency associated with a reflective target. In some cases, the interference may cause a radar source to trigger unnecessary actions based on false detection of a target, fail to trigger actions that should be triggered in the presence of a target based on a failure to detect a real target due to the presence of interference, transmit additional radar chirps in an attempt to distinguish a target, thereby increasing processing and communication resource consumption, and/or the like.

Figure 1:
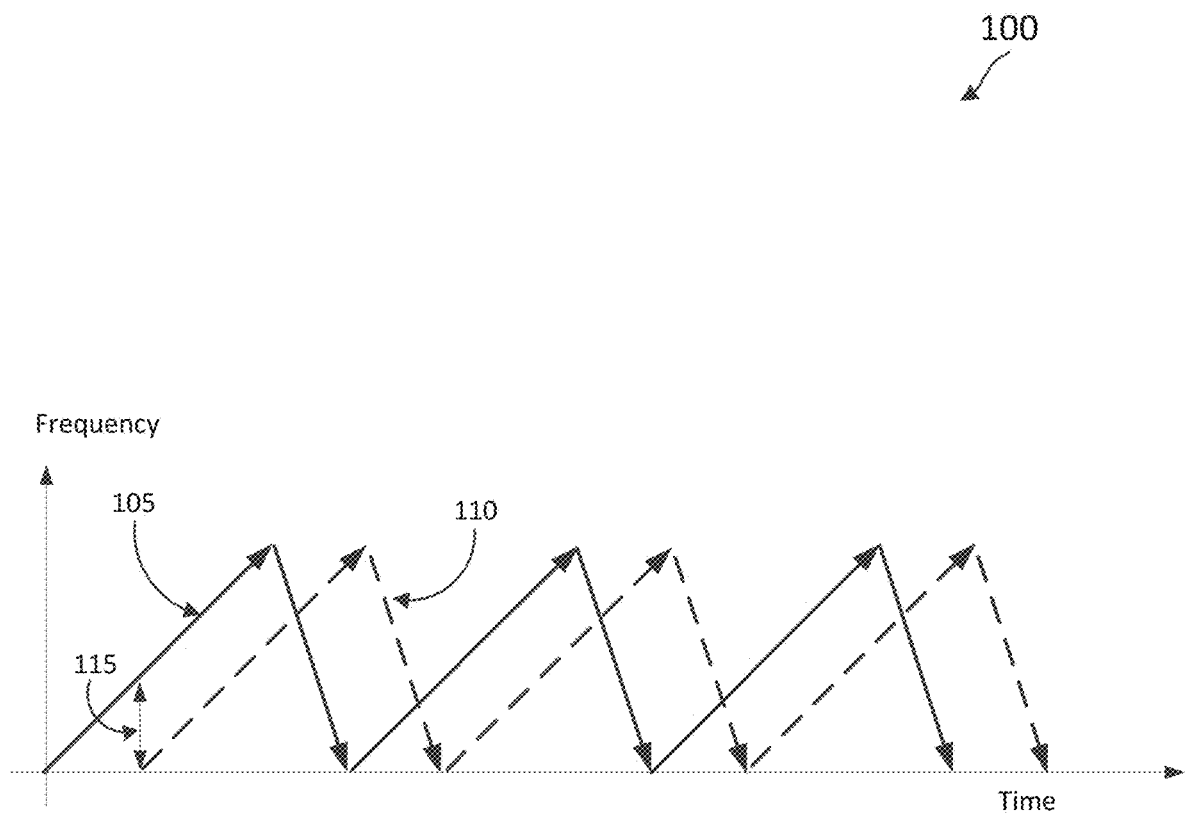
FIG. 1 shows an example illustration of multiple interfering radar signals, according to some aspects of the disclosure.

In some aspects, an example of a radar type the source of which may be difficult to distinguish is frequency-modulated continuous-wave (FMCW) radar. FMCW radar is a short-range measuring radar capable of providing distance measurements to a target object along with speed measurements of the target object. FMCW may use a transmitted signal of a known stable frequency continuous wave that varies in frequency over a fixed period of time by a modulating signal. The frequency difference between the received (reflected) signal and the transmitted signal increases with delay, and hence with distance. This may smear out, or blur, the Doppler signal. Echoes from a target object can then mixed with the transmitted signal to produce a beat signal, which may provide the distance to the target object after demodulation FIG. 1 shows an example illustration of FMCW radar signals, according to some aspects of the disclosure. In some aspects, the radar signals emitted by radar sources (e.g., the above-mentioned first radar source or interferers) may be FMCW signals, illustrated in FIG. 1 by a plot showing repeated FMCW chirps 105 in terms of frequency over time and of a received signal 110. In some aspects, a single instance (e.g., cycle) of the FMCW chirp 105 may be represented by a pair of arrows—a rising arrow representing an increase from a first frequency value to a second frequency value (e.g., a frequency sweep), and an immediately subsequent falling arrow, indicating a decrease from the second frequency value to the first frequency value. Similarly, a single instance of the received signal 110 may be represented by a pair of arrows—a rising arrow representing an increase from a first frequency value to a second frequency value and an immediately subsequent falling arrow, indicating a decrease from the second frequency value to the first frequency value.

In some aspects, FMCW radar uses a linear frequency modulated signal to obtain range. The received signal is mixed with the transmitted signal to obtain the beat frequency 115 between the two. The beat frequency may be a difference between an instantaneous frequency of the FMCW chirp 105 and a corresponding instantaneous frequency of the received signal 110. The beat frequency may be a function of the round-trip time to the reflecting target, and therefore can be mapped directly to the target's range.

Figure 2:
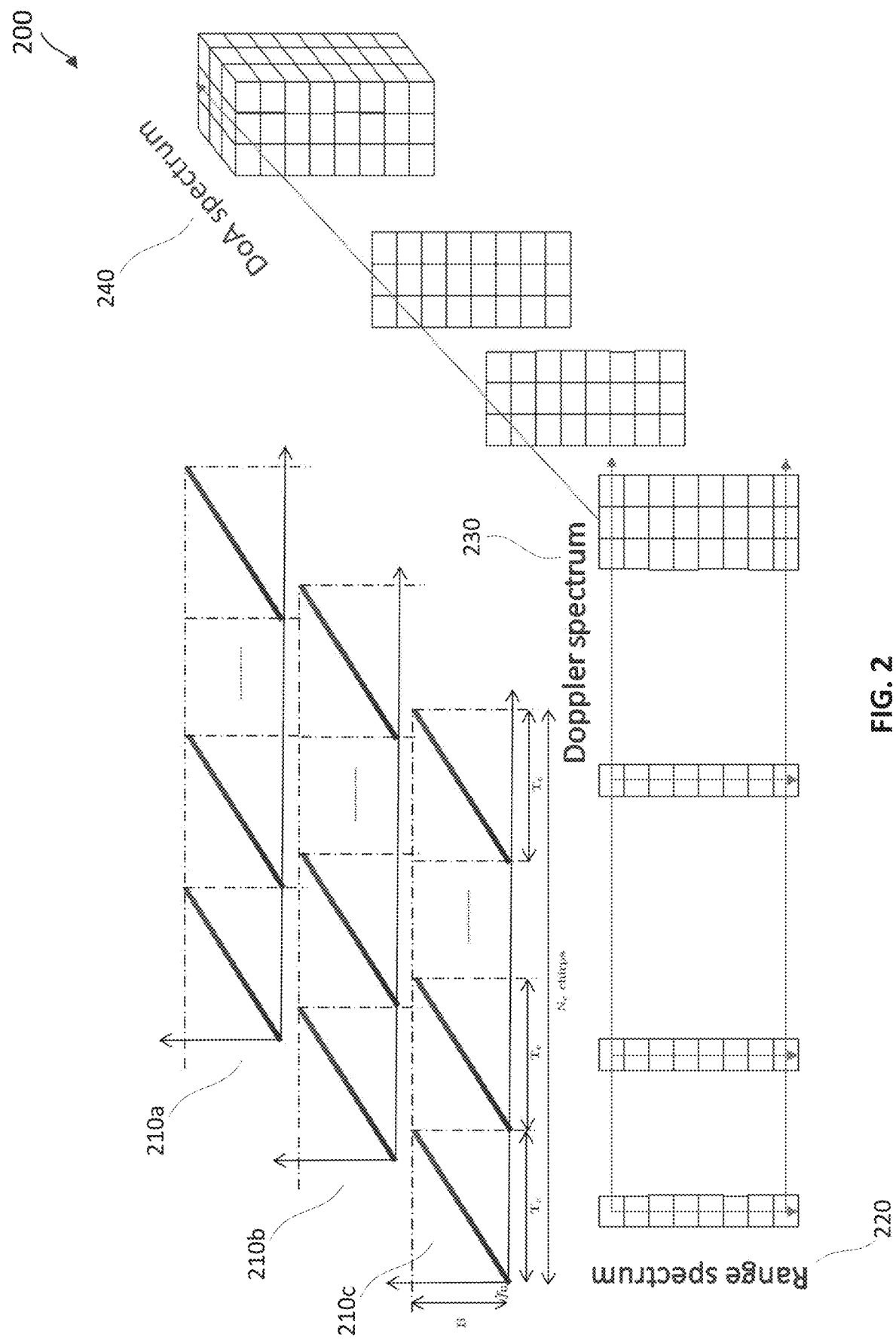
FIG. 2 shows an example illustration of frequency modulated continuous wave (FMCW) radar signals and expression thereof as three-dimensional (3D) tensor, according to some aspects of the disclosure.

Beamforming associated with multiple receiver channels may be used to determine direction of arrival (DoA) of a received signal, which may correlate to a target's azimuthal location and/or elevation, if applicable. Multiple radar signal chirps may be transmitted in a train of equally spaced pulses in time. Radial motion occurring between pulses within a range of resolution cell induces a shift over the pulses, which may be used to compute the Doppler radial velocity in that cell. Received radar data may be expressed as a three-dimensional (3D) tensor, with the first two dimensions (range and DoA) making up polar space, and the third dimension (Doppler radial velocity) containing velocity information. FIG. 2 shows an example illustration of the expression of radar data as a 3D tensor, where from multiple radar signal chirps 210a-210c, target ranges 220 and DOA values 240 of received signals may be determined. Further, in some aspects, as noted above, the multiple radar signal chirps 210a-210c may be transmitted in a train of equally spaced pulses in time, and radial motion occurring between pulses may induce shifts over the pulses, which may then be used to compute Doppler velocities 230.

Figure 3:
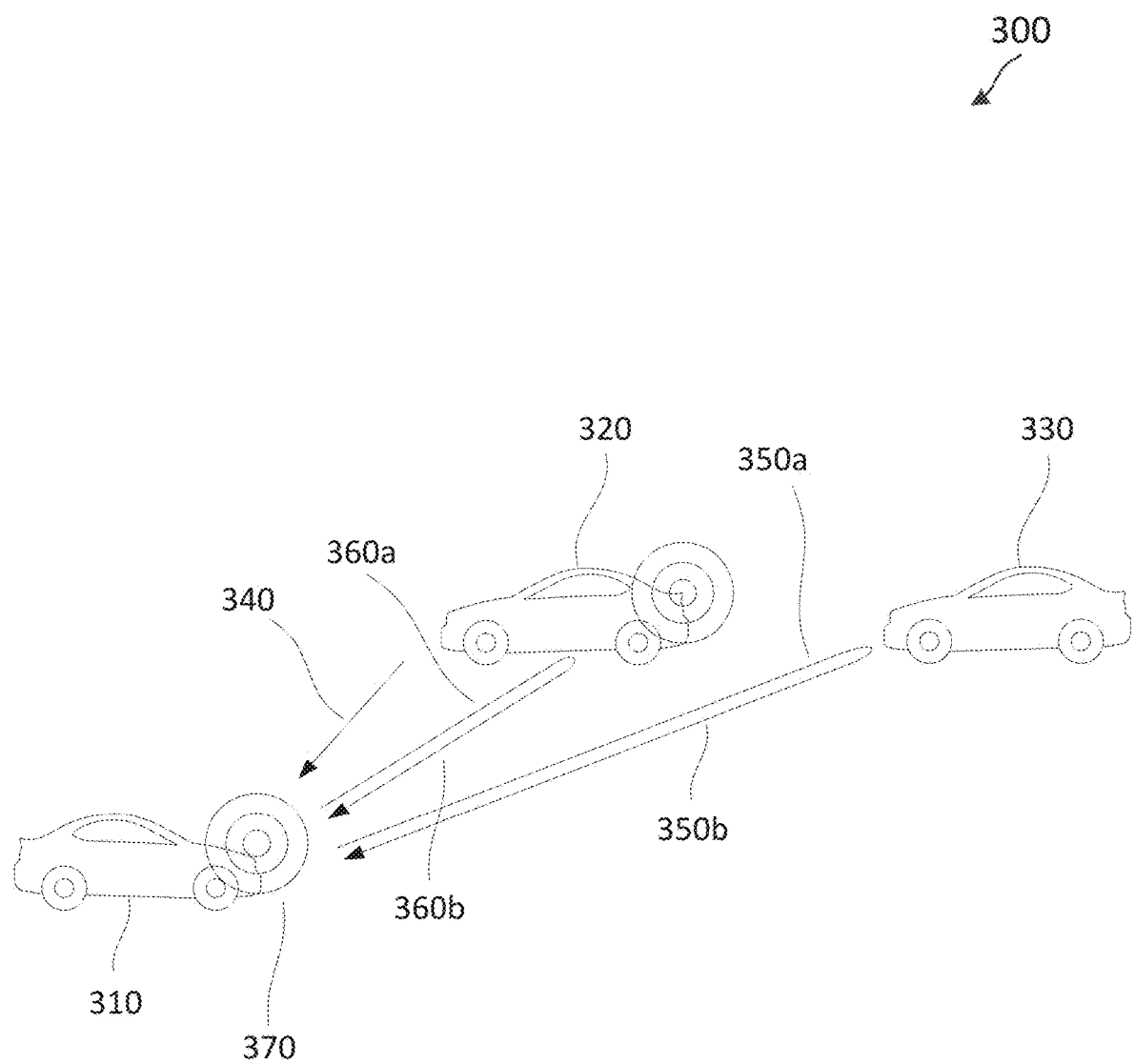
FIG. 3 shows an example illustration of frequency modulated continuous wave (FMCW) radar signals and expression thereof as three-dimensional (3D) tensor, according to some aspects of the disclosure.

FIG. 3 shows an example illustration of multiple interfering radar signals, according to some aspects of the disclosure. In some aspects, multiple radar sources such as a first radar source 310 (e.g., vehicle 310 having a first radar system) and a second radar source 320 (e.g., another vehicle having a second radar system) may be transmitting signals when the radar sources 310, 320 are in the vicinity of each other and/or a target 330 (e.g., vehicle, pedestrian, etc.) is in the vicinity of the radar sources 310, 320. In some aspects, the term "vicinity" about a radar source may be understood to refer to the area surrounding the radar source where the signals emitted by the radar source, or intensities thereof, have not decayed by more than a threshold amount (e.g., by more than about 50%, about 70%, about 80%, about 90%, about 95%, about 99%, including values and subranges therebetween, of the signals emitted by the radar source). In some aspects, the term "vicinity" about a target may be understood to refer to the area surrounding the target where radar signals received at the "vicinity" not have decayed by more than a threshold amount (e.g., by more than about 50%, about 70%, about 80%, about 90%, about 95%, about 99%, including values and subranges therebetween, of the signals emitted by the radar source) compared to the radar signals received at the target. In some aspects, the term "vicinity" about a radar source may be understood to include the area within about 100 m, about 300 m, about 500 m, about 750 m, about 1000 m, about 1500 m, about 2500 m, about 5000 m, including values and subranges therebetween, of the radar source. In some aspects, the term "vicinity" may have its customary and plain meaning. It should be clear from the context in which the term "vicinity" is used which meaning of the term applies.

In some aspects, the first radar source 310 may be tracking or detecting the target 330, which may be in the vicinity of a second radar source 320, and the first radar source 310 may use its radar system to emit a radar signal to detect the target 330. In some cases, the signals emitted by the first radar source 310 to detect and/or track the target 330 include signals 350a emitted in the direction of the target 330 and signals 360a emitted in the direction of the second signal source 320. In some cases, the signals 350a emitted to the target may be reflected back to the first radar source 310 as target reflection signals 350b and the signals 360a emitted in the direction of the second radar source 320 may be reflected back as second radar source reflection signals 360b. In some aspects, the second radar source 320 may also emit its own signals, for example using its radar system, and these second radar source signals 340 may be directed to and arrive at the first radar source 310.

In some aspects, the presence of the second radar source 320 (alternatively referred as "interferer") in the vicinity of the first radar source 310 may interfere with or impact the detection or tracking of the target 330 by the first radar source 310. In some instances, the term "interference" may be broadly understood as the mis-detection or mis-tracking of a target by a radar source due to signals transmitted or reflected by interferers that are in the vicinity of the target and/or the radar source. Because radar waveforms (e.g., such as some conventional ones currently in use) can be indistinguishable when coming from different sources, the interference from the interferer 320 may cause the first radar source 310 to erroneously detect a "ghost" or false target located at about half the distance to the interferer 320 reflecting signals. For instance, the first radar source 310 may erroneously determine that a ghost vehicle is present at about half the distance to the interferer 320, because the first radar source 310 may interpret the radar signal received from the interferer 320 as having traveled from the first radar source 310 to the ghost target and back in the time it actually took the received signal (e.g., received signal 340) to travel from the interferer 320 to the first radar source 310 (e.g., including time offset due to reflection as opposed to taking a direct path). Further, the ghost target may appear as having higher power (i.e., the interference may be high), because the power of signals from a direct path, such as the power of interferer signals 340 received at first radar 310 is inversely proportional to the square of the distance R ($R^2$) from the signal source (e.g., interferer 320) to the first radar source 310, while the power of reflected signals, such as the power of interferer reflection signals 360*b* received at the first radar source 310 is inversely proportional to the fourth power of the distance R ($R^4$). In some aspects, the example spectral analyses 440 shown in FIG. 4, of transmitted and received signals of a radar source and an interferer sweeping in the same direction illustrates the appearance of a ghost or false target as a result of the interference from the interferer.

Figure 4:
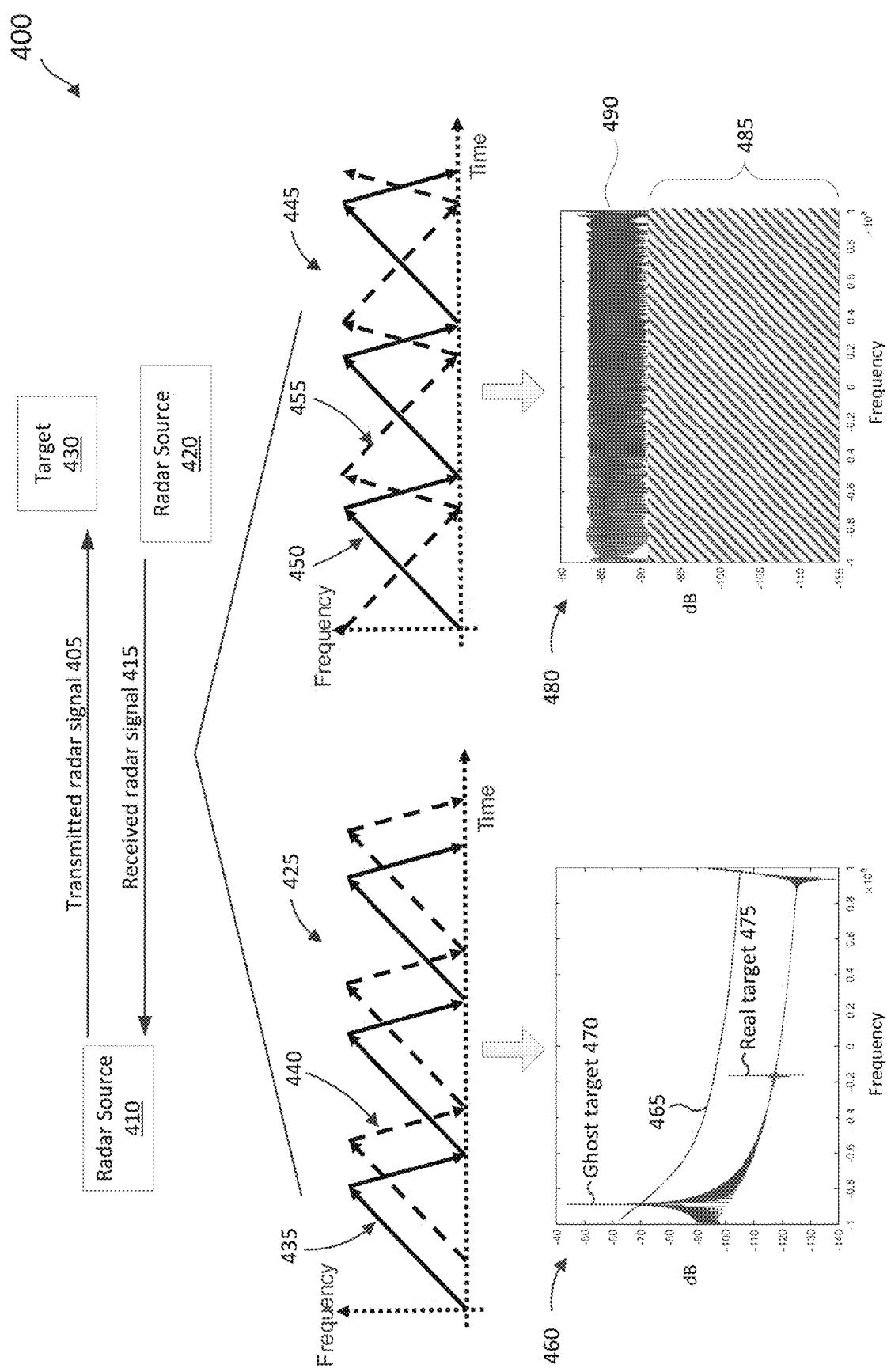
FIG. 4 shows an example illustration of radar interferences based on sweeping directions of radar signals from a radar source and an interference source, according to some aspects of the disclosure.

FIG. 4 shows an example illustration of radar interferences based on sweeping directions of radar signals from a radar source and an interference source, according to some aspects of the disclosure. In some aspects, a first radar source 410 may be tracking or detecting the target 430, which may be in the vicinity of one or more radar sources (e.g., a second radar source 420). Although the discussion herein refers to one interfering radar source, the second radar source 420, in some aspects, the discussion equally applies to more than one interfering radar sources. In some instances, the first radar source 410 and the second radar source 420 can be vehicles (e.g., such as vehicle 310, and vehicle 320 respectively, in FIG. 3). Further, the target can also be a vehicle or pedestrian, etc. (e.g., such as target 330 in FIG. 3). In some cases, the vehicles can be autonomous or may be operated by an operator.

In some aspects, the first radar source 410 may transmit a radar signal 405, which can be, for example, an FMCW radar signal, to detect and/or track the target 430. For instance, the first radar source 410 may transmit a series (e.g., a train) of chirps 435, where a chirp may refer to a cycle of an FMCW radar signal (i.e., a cycle of an increase in frequency followed by a fall to about the same frequency level). In some aspects, the first radar source 410 may transmit the radar signal 405 according to a set of transmission parameters. For example, for an FMCW radar signal, the set of transmission parameters may include a carrier frequency, a bandwidth sweep range (e.g., the signal may be transmitted across a 1 GHz range, a 1.5 GHz range, and/or the like), a sweeping time (e.g., the radar device may complete a bandwidth sweep of the signal in 2 microseconds, 6 microseconds, 12 microseconds, and/or the like), a direction of a sweep (e.g., a chirp of the signal may be directed from one angle to another angle about some axis from the radar source, or the sweeping can be in the reverse direction, although any parameter indicating a direction of the sweep may be used), a direction of a chirp (e.g., a chirp may include an up-sweep followed by a down-sweep, or include a down-sweep followed by an up-sweep), and/or the like. In some aspects, the first radar source 410 may determine the transmission parameters for the transmitted signal 405 using a listen before talk procedure (e.g., at a turn-on of the first radar source 410).

In some aspects, the first radar source 410 may receive a radar signal 415, which may include a reflection of the transmitted radar signal 405 (e.g., reflected by the target 430 and/or other bodies in the vicinity of the target 430 such as the radar source 420) and/or radar signals transmitted by other nearby radar sources (e.g., radar source 420). In some cases, the received radar signal 415 may be an FMCW radar signal. Thus, the received radar signal 415 may interfere with detection and/or tracking operations of the first radar source 410 (e.g., to detect and/or track the target 430).

In some aspects, the transmitted radar signal 405 and the transmitted radar signal 415 may sweep in the same direction or in opposite direction. For example, frequency spectrum 425 shows the transmitted radar signal 405, shown as chirps in solid line 435, and the received radar signal 415, shown as chirps in dashed line 440, sweeping in the same direction, while frequency spectrum 445 shows the transmitted radar signal 405, shown as chirps in solid line 450, and the received radar signal 415, shown as chirps in dashed line 455, sweeping in the opposite direction. That is, frequency spectrum 425 shows the solid line chirps 435 and the dashed line chirps 440 sweeping up or down together, while frequency spectrum 445 shows that when the solid line chirps 450 are sweeping up, the dashed line chirps 455 are sweeping down (and vice versa).

In some aspects, the first radar source 410 may process the transmitted radar signal 405 and the received radar signal 415. For instance, the first radar source 410 may mix (e.g., multiply) the transmitted radar signal 405 (e.g., a single cycle of the transmitted radar signal 405) and the received radar signal 415 (e.g., a single cycle of the received radar signal 415) to obtain a mixed signal (e.g., a mixer output). The first radar source 410 may further process the mixed signal by filtering and/or performing a spectral analysis. The spectral analysis may include performing an FFT of the mixed signal (e.g., per cycle/chirp) to yield a range spectrum, such as the range spectrum 460 for the case of the transmitted radar signal 405 and the transmitted radar signal 415 sweeping in the same direction and the range spectrum 475 for the case of the transmitted radar signal 405 and the transmitted radar signal 415 sweeping in the opposite direction. In some cases, the first radar source 410 may obtain one or more measurements, such as energy level measurements, from the range spectra (e.g., 460, 475).

In some aspects, the energy level measurements may be associated with a beat frequency for the transmitted radar signal 405 and the received radar signal 415. In some instances, a beat frequency may be represented by a spike on a range spectrum when the received radar signal is sweeping frequency in the same direction as the transmitted radar signal. For example, a beat frequency for the transmitted radar signal 405 and the received radar signal 415 (e.g., for a ghost target) may be represented by a spike 470 on the range spectrum and a beat frequency for the transmitted radar signal 405 and a reflection of the transmitted radar signal 415 (e.g., for a real target) may be represented by another spike 480 on the range spectrum. As shown, the interference may produce a stronger signal than a real target (e.g., the spike 470 indicating the ghost or false target may be a stronger signal than the spike 480 indicating the real target 480). Accordingly, in some aspects, the energy level measurement may be a peak energy level measurement associated with one or more spikes of the range spectrum.

In some aspects, a beat frequency may be represented by wideband noise on a range spectrum when the received radar signal is sweeping frequency in the opposite direction as the transmitted radar signal. For example, a beat frequency for the transmitted radar signal 405 and the received radar signal 415 (e.g., for a false target) may be represented by wideband noise 490, which may have an elevated noise floor relative to background thermal noise. Accordingly, in some aspects, the energy level measurement may be a total energy level measurement.

In some instances, the first radar source 410 may determine whether the one or more measurements satisfy a threshold value. For example, the first radar source 410 may determine whether a peak energy level measurement, associated with a spike of the range spectrum, satisfies (e.g., is more than) a threshold value 465 (e.g., a range-dependent threshold value). Additionally, or alternatively, the first radar source 410 may determine whether a total energy level measurement satisfies a threshold value 485. In this way, the first radar source 410 may determine that the received radar signal 415 is associated with interference, rather than a reflection of the transmitted radar signal 405, when a peak energy level measurement and/or a total energy level measurement satisfies a respective threshold value.

In some aspects, a threshold value may be configured, or otherwise provisioned, for the first radar source 410. In some aspects, the first radar source 410 may determine a threshold value. For example, the first radar source 410 may determine a threshold value based at least in part on previous measurements, a pattern of previous measurements, and/or the like. As an example, the first radar source 410 may determine a threshold value based at least in part on an output of a machine learning model, an algorithm, or the like. In such cases, the first radar source 410 may dynamically determine a threshold value that is to be used for each spectral analysis performed by the first radar source 410.

As described above, the measurements may be associated with a range spectrum, which is determined by the first radar source 410 on a per cycle/chirp basis. Thus, for each cycle/chirp of the transmitted radar signal 405 and the received radar signal 415, the first radar source 410 may obtain measurements and determine whether the measurements satisfy a threshold value, as described above. In this way, the first radar source 410 may identify likely interference in real time and as part of normal radar processing operations performed by the first radar source 410.

In some aspects, interference at a location of a target may be elevated when the radar sources (e.g., the radar source detecting the target and the interferers) congregate or crowd at a location (e.g., of targets) and also use radar signals that have similar or same properties, such as but not limited to frequency, chirp, bandwidth, power, frames, etc. In some cases, the level of signal interference at the location of targets 430 may be low when the interferers 420 and targets 430 are scattered over a wide area, in which case the interferers 420 and targets 430 may appear less congested on a radar image captured by the radar source 410, allowing for the enhanced detection/tracking of the targets 430 by the first radar source. When the interferers 420 and the targets 430 are congregated or crowded together, however, the interferers 420 and targets 430 may appear congested on the radar image of the radar source 410, rendering the detection/tracking of the targets 430 by the first radar source difficult. In such cases, it may be advantageous for a first radar source 410 detecting a target 430 to adjust its own radar signal transmission parameters based on the level of interference or radar signal congestion caused by nearby interferers 420 (e.g., at the location of a target), for example, to reduce the level of interference and improve target detection/tracking.

Figure 5:
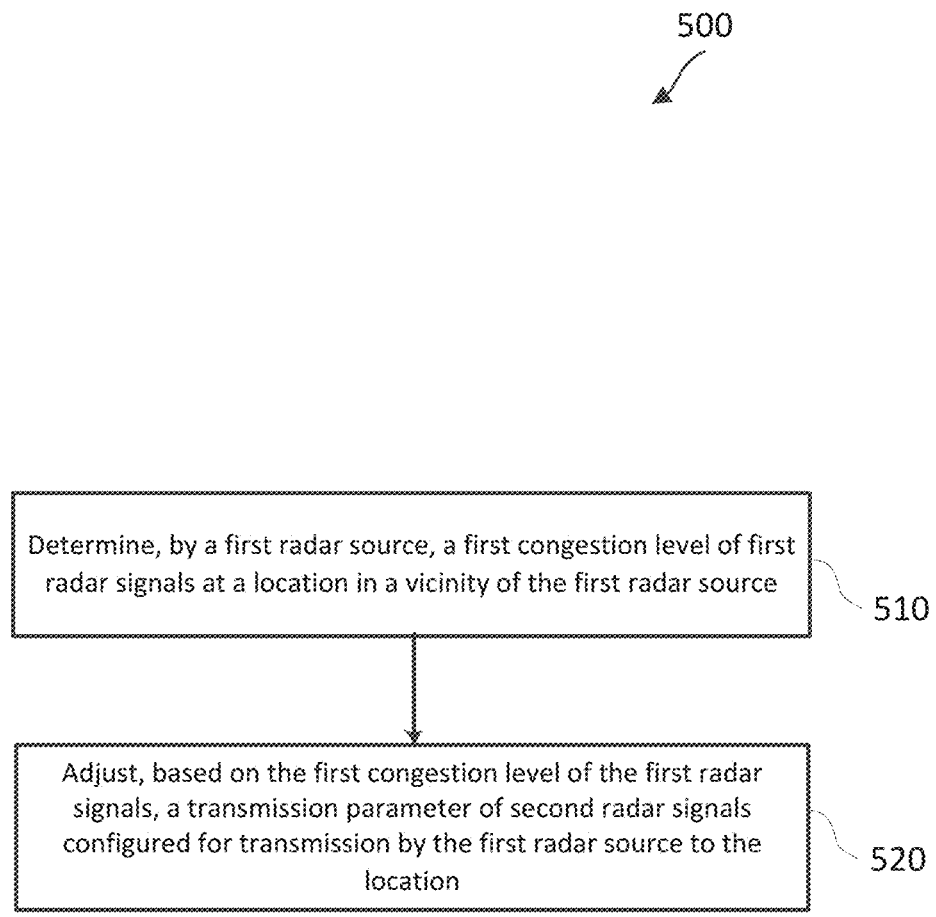
FIG. 5 shows an example flow diagram of a method of adjusting transmission parameters of radar signals based on radar signal congestion measurements, according to various aspects of the disclosure.

FIG. 5 shows an example flow diagram of a method 500 of adjusting transmission parameters of radar signals based on radar signal congestion measurements, according to various aspects of the disclosure. The method 500 may be performed by a radar source detecting and/or tracking a target, such as the radar source 410, or radar source 310. For example, a radar source, such as radar source 310, 410 may utilize one or more components, such as the reception component 702, the transmission component 704, the radar transmission adjustment (RTA) component 708, etc., to execute the steps of method 500. As illustrated, the method 500 includes a number of enumerated steps, but aspects of the method 500 may include additional steps before, after, and in between the enumerated steps. In some aspects, one or more of the enumerated steps may be omitted or performed in a different order.

In some aspects, at block 510, a first radar source may transmit first radar signals, for instance, to a location in a vicinity of the first radar source. The first radar signals may contribute to interference or signal congestion at the location in the vicinity of the first radar source, which may be caused in part due to second radar signals transmitted towards the location by second radar sources (e.g., nearby radar sources or interferers). In some instances, the location can be the location of the first radar source, a target the first radar source may be detecting and/or tracking, etc.

In some aspects, at block 520, the first radar source may receive, from the one or more second radar sources, second radar signals and/or radar signal congestion data related to the one or more second radar sources. In some instances, the first radar source may determine the congestion level of radar signals in the vicinity of the radar source and may receive the second radar signals and/or radar signal congestion data for determining the congestion level. In some instances, the radar source may mute its transmitter (e.g., transmission component 704) and allow its receiver (e.g., the reception component 702) to continue operation to receive the second radar signals to allow the determination of the radar signals congestion level at the location in the vicinity of the radar source. For example, in some cases, after muting its own transmitter, the radar source may measure the energy and/or the power of the signals received by the receiver of the radar source. That is, the radar source may receive, via its receiver, the second radar signals from the one or more second radar sources (e.g., nearby interferers) and measure the in-band energy and/or the in-band power spectral density of the received radar signals (e.g., which may not include contribution from the radar source itself because the transmitter may be muted).

After measuring the in-band energy and/or the in-band power spectral density of the received radar signals, in some aspects, the first radar source may determine the level of radar signal congestion or interference at the location in the vicinity of the first radar source based on the measured in-band energy and/or in-band power spectral density. That is, the measured in-band energy and/or the in-band power spectral density of the received radar signals can be indicators of the congestion level in the vicinity of the radar source. In some instances, the first radar source, via the RTA component 708, may relate the measured in-band energy and/or in-band power spectral density to a radar signals congestion level based on a known or pre-determined correlation or relationship between the former and the latter. As a non-limiting illustrative example, a first range of the in-band energy and/or the in-band power spectral density may be correlated to a "low" level of congestion, a second range of the in-band energy and/or the in-band power spectral density with values higher than the first range may be correlated to a "medium" level of congestion, a third range of the in-band energy and/or the in-band power spectral density with values higher than the second range may be correlated to a "high" level of congestion, etc., and the congestion level of the measured in-band energy and/or in-band power spectral density may be determined or identified based on such correlations or relationships. As another example, the in-band energy and/or the in-band power spectral density may be related (e.g., via a formula) to values quantifying radar signals congestion level, and the congestion level of the measured in-band energy and/or in-band power spectral density may be determined based on such a formula/relationship. It is to be understood that the above example is non-limiting and is intended for illustrative purposes, and that any relationship, correlation, formula, etc., that establishes a direct correspondence between the in-band energy and/or in-band power spectral density and a radar signals congestion level is applicable for relating the former to the latter. In some cases, the term "direct correspondence" refers to a correspondence where an increasing/higher in-band energy and/or in-band power spectral density implies an increasing/higher congestion level, and a decreasing/lower in-band energy and/or in-band power spectral density implies a decreasing/lower congestion level.

In some aspects, instead of or in addition to using the second radar signals received by the transmitter of the first radar source, the first radar source may determine the congestion level of the second radar signals based on information or data received from nearby one or more second radar sources. For example, the first radar source can be a first vehicle detecting and/or tracking a target vehicle, and other one or more vehicles in the vicinity of the first radar source and/or target may be sources of the interference, i.e., the other one or more vehicles can be the one or more second sources of the second radar signals that are contributing to the interference or congestion at the location in the vicinity of the first radar source and/or target. In some aspects, the first radar source may receive messages from the one or more second radar sources, which may allow the first radar source to determine the level of congestion or interference at the location of the first radar source and/or target. In some instances, the communication link via which the messages are received at the first radar source may be a sidelink communication link, such as but not limited to a vehicle-to-vehicle (V2V) communication link, a vehicle-to-infrastructure (V2I) communication link, a vehicle-to-everything (V2X) communication link, etc. In some aspects, the communication link may also be used by the first radar source to transmit messages back to the one or more second radar sources, examples of such messages including instructions or requests for the one or more second radar sources or vehicles to adjust their radar signal parameters, etc.

In some aspects, the messages from the one or more second radar sources (e.g., interfering vehicles) to the first radar source may allow the first radar source to determine the number of the one or more second radar sources, at the location in the vicinity of the first radar source and/or target, that are transmitting radar signals to the location (e.g., the number of the one or more vehicles), and the first radar source may use this number as an indication of the level of radar signal congestion at that location. For instance, the one or more radar source vehicles that are transmitting radar signals to the location (e.g., and as such contributing to the radar signals interference or congestion) may indicate their locations in their respective messages to the first radar source, and the first radar source may calculate or estimate the number of the one or more second radar sources based on the received messages. In some cases, a given number or ranges of numbers of radar source vehicles may be correlated with varying levels of radar signal congestion, and in such cases, the first radar source can determine the congestion level at that location based on the calculated or estimated number of the one or more second radar sources.

In some aspects, the messages from the one or more second radar sources to the first radar source may include other data, in addition or instead of the respective locations of the one or more second radar sources, that can be used to determine congestion level at the location in the vicinity of the first radar source and/or target. For example, based on data related to the motion or mobility of a second radar source vehicle (e.g., nearby interferer vehicle), which may include information related to but not limited to the speed, direction, etc., of the second radar source vehicle, the first radar source may determine that that second radar source vehicle is unlikely to contribute to the congestion (e.g., because the vehicle is traveling at a high speed and/or is traveling away from the first radar source and/or target, etc.). In other words, the first radar source may receive location, motion/mobility, etc., information to map the one or more second radar sources that are nearby, and determine the congestion level at the location in the vicinity of the first radar source and/or target based on the information. For example, using the location, motion, etc., information, the first radar source may calculate the number of interferer vehicles that are transmitting radar signals towards the location in the vicinity of the first radar source and/or target, and determine or estimate the congestion level at that location based on that number of interferer vehicles.

In some aspects, the messages may also include data related to the radar capabilities, etc., of the one or more second radar sources. For instance, the one or more second radar sources may indicate in their messages to the first radar source the properties of the radar signals that the respective second radar source is transmitting towards the location in the vicinity of the first radar source and/or target, examples of such radar signal properties including but not limited to frequency, chirp length, bandwidth, power, frames, etc. In such cases, the first radar source may use the received information to determine congestion level at the location in the vicinity of the first radar source and/or target. For example, different values of the radar signal properties may be associated with different levels of radar signal congestions, and the first radar source may determine the radar signals congestion level at the location in the vicinity of the first radar source and/or target based on the radar signal properties of the one or more second radar sources (e.g., as indicated in their respective messages to the first radar source).

Returning now to FIG. 5, in some aspects, at block 530, the first radar source may transmit third radar signals, wherein at least one transmission parameter of the third radar signals may have a value different from that of a corresponding at least one transmission parameter of the first radar signals based on a first congestion level in a vicinity of the first radar source. In other words, the first radar source may adjust, based on the congestion level of radar signals at the location in the vicinity of the first radar source, a transmission parameter of the third radar signals that the first radar source is configured to transmit to the location. For example, as discussed above, a first radar source, such as a first radar source vehicle, may determine the radar signals congestion level at the location in the vicinity of the first radar source and/or a target that the first radar source is detecting/tracking. The congestion level may be a measure of radar signals congestion or interference caused by second radar signals emitted by other radar sources (e.g., interfering nearby vehicles), and the first radar source may determine the congestion level based on power and/or energy measurements (e.g., in-band energy and/or in-band power spectral density measurements) of the second radar signals and/or based on messages from the other radar sources including information about their location, motion, radar capability, etc., of those other radar sources, as described above.

In some aspects, the determined congestion level may exceed a first congestion threshold level indicating high signal congestion at the location, and the first radar source may adjust the signal transmission parameters of the third radar signals it transmits to reduce the congestion level at that location to no greater than the first congestion threshold level. For example, the first congestion threshold level can be a pre-determined congestion level. As another example, the first congestion threshold level can be a congestion level above which radar sources (e.g., the first radar source or the nearby one or more second radar sources) are not capable of detecting or tracking their respective targets. Upon determining that the determined congestion level has exceeded the threshold congestion level, in some aspects, the first radar source may adjust the transmission parameters of the third radar signals it is transmitting to lower the determined congestion level to at or below the threshold congestion level. In other words, the value of the at least one transmission parameter of the third radar signals may be less than the value of that corresponding at least one transmission parameter of the first radar signals. Examples of said transmission parameters of the radar signals include but are not limited to transmission power, chirp length, bandwidth (e.g., sweeping bandwidth), frames, etc., of the radar signals. That is, for instance, the first radar source may reduce transmission power, chirp length, bandwidth (e.g., sweeping bandwidth), frames (e.g., length, duration, etc.) of the third radar signals.

In some aspects, adjusting the transmission power of the third radar signals may include reducing the transmission power of the third radar signals to lower the determined congestion level (e.g., at the location in the vicinity of the first radar source or the target the first radar source is detecting/tracking) to at or below the threshold congestion level. That is, the first radar source may reduce the transmission power of the third radar signals the first radar source is transmitting to the location so that the determined congestion level is at or below the threshold congestion level, and radar signals interference is reduced at the location. In some instances, by reducing the transmission power of its third radar signals, the first radar source may also reduce its own range resolution capabilities, i.e., the ability of the first radar source to distinguish between targets that are closely situated, or traveling at same or substantially similar speed, at a given distance.

In some instances, range resolution may refer to the minimal range separation between two targets (e.g., vehicles) that are closely situated, or traveling at the same or substantially similar speed, before the first radar source can distinguish the two targets as separate entities. Reduction by the first radar source of the transmission power of its third radar signals may decrease the range resolution (i.e., increase the minimal range separation). In some aspects, the first radar source may not reduce the transmission power of the third radar signals to below a transmission power level where the range resolution of the first radar source falls below a threshold range resolution (i.e., the minimal range separation may not be increased above a threshold minimal range separation). That is, in some instances, the first radar source may reduce the transmission power of the third radar signals to transmission power levels where the determined congestion level is at or below the threshold congestion level and the range resolution of the first radar source is at or above the threshold range resolution. In some cases, the threshold range resolution can be the minimal range separation between two closely situated targets (e.g., vehicles) below which the first radar source is not capable of distinguishing between the targets.

In some aspects, adjusting the chirp length of the radar signals may include reducing the length of the radar signal chirps to lower the determined congestion level (e.g., at the location in the vicinity of the first radar source or the target the first radar source is detecting/tracking) to at or below the threshold congestion level. That is, the first radar source may reduce the chirp length of the third radar signals the first radar source is transmitting to the location so that the determined congestion level is at or below the threshold congestion level, and radar signals interference is reduced at the location. In some instances, by reducing the chirp length of its third radar signals, the first radar source may also reduce its own detectable range and/or range resolution capabilities. That is, reduction in chirp length may reduce the detectable range capability of the first radar source, i.e., the maximum distance from the first radar source beyond which the first radar source may not be able to detect a target. Further, the reduction in chirp length may also reduce range resolution capabilities, i.e., the ability of the first radar source to distinguish between targets that are closely situated at a given distance.

In some instances, reduction by the first radar source of the chirp length of its radar signals may decrease the range resolution (i.e., increase the minimal range separation). In some aspects, the first radar source may not reduce the chirp length of the radar signals to below a chirp length where the detectable range and/or the range resolution of the first radar source fall below a threshold detectable range and/or a threshold range resolution, respectively. For example, the first radar source may not reduce the chirp length of the third radar signals to below a chirp length where the minimal range separation is increased above a threshold minimal range separation. That is, in some instances, the first radar source may reduce the chirp length of the third radar signals to chirp lengths where the determined congestion level is at or below the threshold congestion level, and the detectable range and/or range resolution of the first radar source are at or above their respective thresholds. In some cases, the threshold detectable range can be the distance from the first radar source to a target (e.g., vehicles) beyond which the first radar source is not capable of detecting the target or the uncertainty in detecting the target are beyond a minimal uncertainty level. Further, the threshold range resolution can be the minimal range separation between two closely situated targets (e.g., vehicles) below which the first radar source is not capable of distinguishing between the targets.

In some aspects, adjusting the bandwidth (e.g., sweeping bandwidth) of the third radar signals of the first radar source may include reducing the bandwidth to lower the determined congestion level (e.g., at the location in the vicinity of the first radar source or the target the first radar source is detecting/tracking) to at or below the threshold congestion level. That is, the first radar source may reduce the bandwidth of the third radar signals the first radar source is transmitting to the location so that the determined congestion level is at or below the threshold congestion level, and radar signals interference is reduced at the location. In some instances, reducing the bandwidth of the third radar signals may increase the detectable range of the first radar source, i.e., the maximum distance from the first radar source beyond which the first radar source may not be able to detect a target. However, the reduction in the bandwidth may also increase errors in measuring target ranges. That is, reducing the sweeping bandwidth may increase uncertainties in target range measurements. In some aspects, the first radar source may not reduce the bandwidth of the third radar signals to below a bandwidth value where the errors or uncertainties in the target range measurements exceed a pre-determined uncertainty. That is, in some instances, the first radar source may reduce the bandwidth of the third radar signals to bandwidth levels where the determined congestion level is at or below the threshold congestion level, and the uncertainties in the target range measurements are at or below the pre-determined uncertainty.

In some aspects, adjusting the frames of the third radar signals may include reducing the radar signals frames to lower the determined congestion level (e.g., at the location in the vicinity of the first radar source or the target the first radar source is detecting/tracking) to at or below the threshold congestion level. That is, the first radar source may reduce the frames of the third radar signals so that the determined congestion level is at or below the threshold congestion level, and radar signals interference is reduced at the location. In some instances, by reducing the frames of its third radar signals, the first radar source may also reduce its own Doppler or velocity resolution capabilities. That is, reduction in radar signals frames may reduce the velocity resolution capabilities of the first radar source, i.e., the ability of the first radar source to distinguish between targets that are traveling at close velocities.

In some instances, Doppler or velocity resolution may refer to the minimal radial velocity difference between two traveling targets (e.g., vehicles) that are at the same or substantially similar range before the first radar source can distinguish the two targets as separate entities. Reduction by the first radar source of the frames of its radar signals may decrease the velocity resolution (i.e., increase the minimal radial velocity difference). In some aspects, the first radar source may not reduce the frames of the third radar signals to below a level where the velocity resolution of the first radar source falls below a threshold velocity resolution (i.e., the minimal radial velocity difference may not be increased above a threshold minimal radial velocity difference). That is, in some instances, the first radar source may reduce the frames of the third radar signals to levels where the determined congestion level is at or below the threshold congestion level, and the velocity resolution of the first radar source is at or above the threshold velocity resolution. In some cases, the threshold velocity resolution can be the minimal radial velocity difference between two targets (e.g., vehicles) traveling at close velocities below which the first radar source is not capable of distinguishing between the targets.

As discussed above, in some aspects, the first radar source may adjust (e.g., reduce) the transmission parameters (e.g., transmission power, chirp length, bandwidth, frames, etc.) of the third radar signals to be transmitted by the first radar source to lower the determined congestion level (e.g., at the location in the vicinity of the first radar source or the target the first radar source is detecting/tracking) to at or below the threshold congestion level. In some aspects, after adjusting the transmission parameters, the first radar source may monitor the congestion level at the location. For instance, the first radar source may measure in-band energy and/or in-band power spectral density of radar signals transmitted by nearby radio sources and received at the first radar source, and determine the congestion level at the location based on the measurements. As another example, the first radar source may receive messages about the location, mobility, radar capabilities, etc., of the nearby radio sources (e.g., from the nearby radio sources via a sidelink communication channel), and determine the congestion level at the location based on the messages.

In some aspects, the newly measured congestion level may be lower than a second congestion threshold level. In some cases, the second congestion threshold level may be lower than the first congestion threshold level. For example, the second congestion level can be a fraction of the first congestion level (e.g., in the range from about 0% to about 90% of the first congestion level, including values and subranges therebetween). In some cases, the second congestion threshold level can be a pre-determined congestion level that is less than the first congestion threshold level. In some instances, upon determining that the newly measured congestion level (e.g., at the location in the vicinity of the first radar source or the target the first radar source is detecting/tracking) is lower than the second congestion threshold level, the first radar source may further adjust the transmission parameters of the radar signals to be transmitted by the first radar source. For example, the first radar source may further adjust (e.g., increase) the transmission parameters. For instance, the first radar source may restore the transmission parameters to the values the respective transmission parameters had prior to the transmission parameter adjustments to reduce the congestion level. That is, the first radar source may transmit fourth radar signals with radar transmission parameters having values different from those of the third radar signals (e.g., and same as those of the first radar signals).

Figure 6:
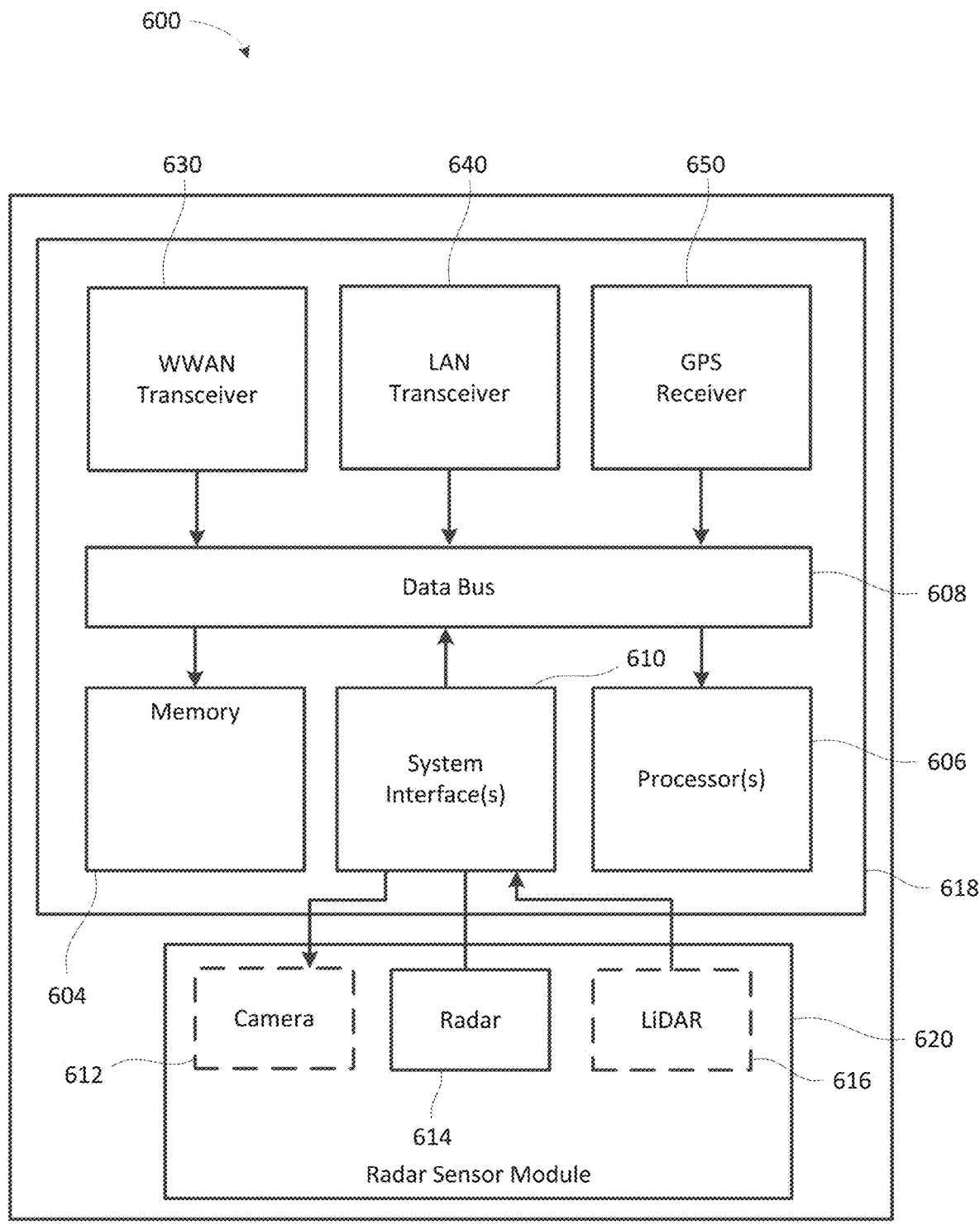
FIG. 6 shows an example illustration of an on-board computer architecture of a radar source, according to some aspects of the disclosure.

FIG. 6 illustrates an on-board computer (OBC) of a radar source such as radar source 310, radar source 410 or radar source 420, according to some aspects of the disclosure. In an aspect, the OBC 600 includes a non-transitory computer-readable storage medium, i.e., memory 604, and one or more processors 606 in communication with the memory 604 via a data bus 608. The memory 604 includes one or more storage modules storing computer-readable instructions executable by the processor(s) 606 to perform the functions of the OBC 600 described herein. For example, the processor(s) 606 in conjunction with the memory 604 may implement the various operations described herein.

In some aspects, one or more radar sensor modules 620 are coupled to the OBC 600 (only one is shown in FIG. 6 for simplicity). In some aspects, the radar sensor module 620 includes an optional camera 612, at least one radar 614, and an optional light detection and ranging (LiDAR) sensor 616.

The OBC 600 also includes one or more system interfaces 610 connecting the processor(s) 606, by way of the data bus 608, to the radar sensor module 620 and, optionally, other vehicle sub-systems (not shown).

The OBC 600 also includes, at least in some cases, a wireless wide area network (WWAN) transceiver 630 configured to communicate via one or more wireless communication networks (not shown), such as an NR network, an LTE network, a Global System for Mobile communication (GSM) network, and/or the like. The WWAN transceiver 630 may be connected to one or more antennas (not shown) for communicating with other network nodes, such as other vehicle, pedestrian devices, infrastructure access points, roadside units (RSUs), base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceiver 630 may be variously configured for transmitting and encoding signals (e.g., messages, indications, information, and so on), and, conversely, for receiving and decoding signals (e.g., messages, indications, information, pilots, and so on) in accordance with the designated RAT.

The OBC 600 also includes, at least in some cases, a wireless local area network (WLAN) transceiver 640. The WLAN transceiver 640 may be connected to one or more antennas (not shown) for communicating with other network nodes, such as other radar source (e.g., radar systems of other vehicles), pedestrian UEs, infrastructure access points, RSUs, etc., via at least one designated RAT (e.g., cellular vehicle-to-everything (C-V2X) communication link, vehicle-to-vehicle (V2V) communication link, vehicle-to-infrastructure (V2I) communication link, IEEE 802.11p (also known as wireless access for vehicular environments (WAVE)), dedicated short-range communication (DSRC), etc.) over a wireless communication medium of interest. The WLAN transceiver 640 may be variously configured for transmitting and encoding signals (e.g., messages, indications, information, and so on), and, conversely, for receiving and decoding signals (e.g., messages, indications, information, pilots, and so on) in accordance with the designated RAT.

As used herein, a "transceiver" may include a transmitter circuit, a receiver circuit, or a combination thereof, but need not provide both transmit and receive functionalities in all designs. For example, a low functionality receiver circuit may be employed in some designs to reduce costs when providing full communication is not necessary (e.g., a receiver chip or similar circuitry simply providing low-level sniffing).

The OBC 600 also includes, at least in some cases, a global positioning systems (GPS) receiver 650. The GPS receiver 650 may be connected to one or more antennas (not shown) for receiving satellite signals. The GPS receiver 650 may comprise any suitable hardware and/or software for receiving and processing GPS signals. The GPS receiver 750 requests information and operations as appropriate from the other systems, and performs the calculations necessary to determine a radar source's position using measurements obtained by any suitable GPS algorithm.

Figure 7:
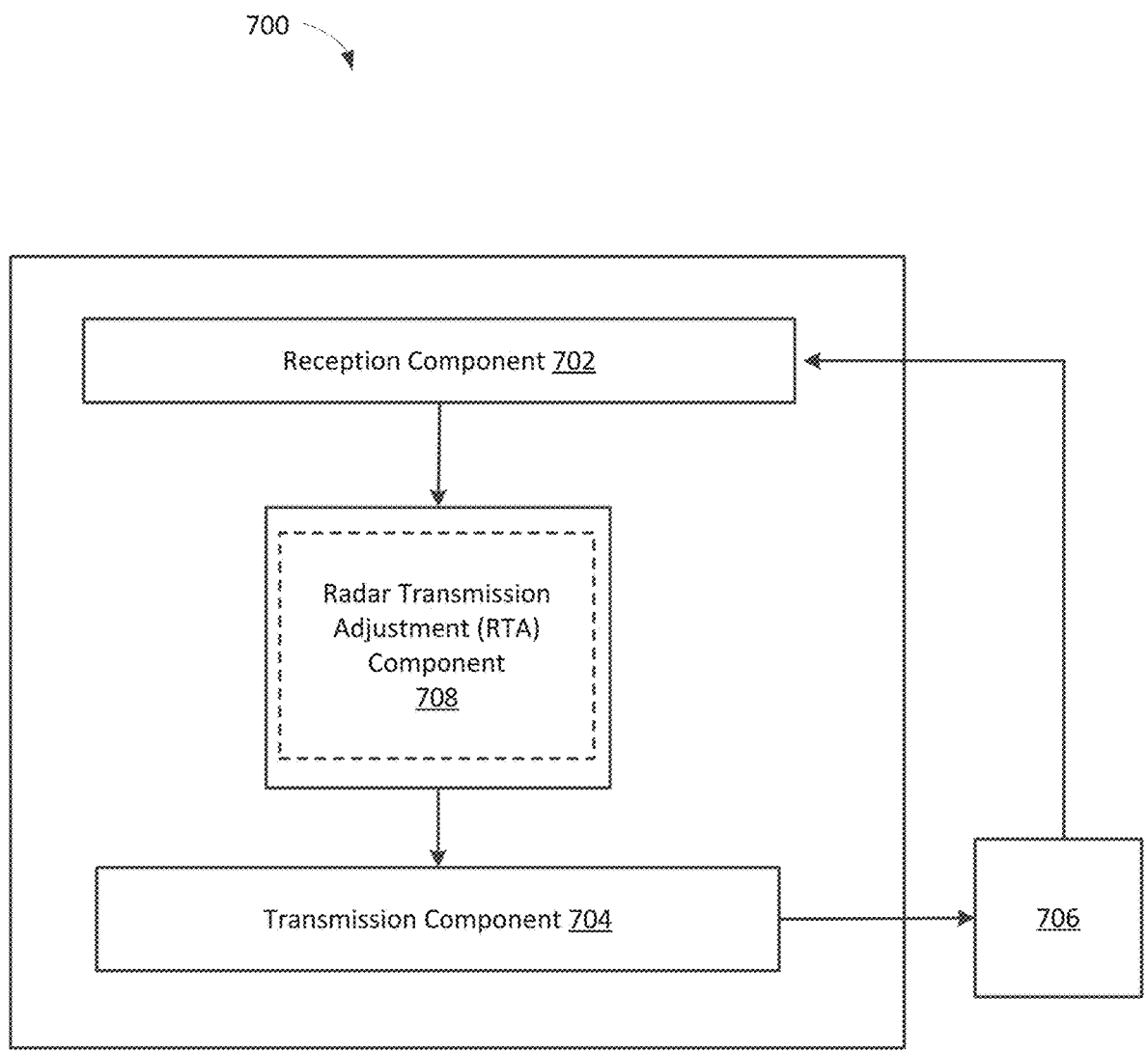
FIG. 7 shows an example block diagram illustrating components of a radar source, according to various aspects of the disclosure.

FIG. 7 shows an example block diagram illustrating components of a radar source, according to various aspects of the disclosure. The apparatus 700 may be a radar source such as radar source 310, radar source 410 or radar source 420, or a radar source may include the apparatus 700. In some aspects, the apparatus 700 includes a reception component 702 and a transmission component 704, which may be in communication with one another (for example, via one or more buses and/or one or more other components). As shown, the apparatus 700 (e.g., a radar source) may communicate with another apparatus 706 (e.g., an interfering or nearby radio source) using the reception component 702 and the transmission component 704. As further shown, the apparatus 700 may include one or more of a radio transmission adjustment (RTA) component or module 708, among other examples.

In some aspects, the apparatus 700 may be configured to perform one or more operations described herein in connection with FIGS. 1-5. In some aspects, the apparatus 700 and/or one or more components shown in FIG. 7 may include one or more components of the radar source described above in connection with FIG. 6. Additionally, or alternatively, one or more components shown in FIG. 7 may be implemented within one or more components described above in connection with FIG. 6. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, messages (e.g., information about location, mobility, radar capability, etc., of nearby radio sources, etc.) or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may receive a radar signal. In some aspects, the reception component 702 may include one or more antennas, a demodulator, a MIMO detector, a receive processor, a controller/processor, a memory, or a combination thereof, of a radar source.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may transmit a radar signal. In some aspects, the transmission component 704 may include one or more antennas, a modulator, a transmit MIMO processor, a transmit processor, a controller/processor, a memory, or a combination thereof, of the radar source (e.g., an ego or interfering radar source). In some aspects, the transmission component 704 may be collocated with the reception component 702 in a transceiver.

The radar transmission adjustment (RTA) component 708 may be implemented via hardware, software, or combinations thereof. For example, the RTA component 708 may be implemented as a processor (e.g., processor 606), circuit, and/or instructions 706 stored in a memory (e.g., memory 604) and executed by a processor. In some examples, the RTA component 708 can be integrated within a modem subsystem of the apparatus 700. For example, the RTA component 708 can be implemented by a combination of software components (e.g., executed by a DSP or a general processor) and hardware components (e.g., logic gates and circuitry) within the modem subsystem. The RTA component 708 may be used for various aspects of the present disclosure, for example, aspects of FIGS. 1-5. The RTA component 708 can be configured to determine a congestion level of radar signals at a location in a vicinity of the radar source. Further, the RTA component 708 may be configured to adjust, based on the congestion level of radar signals at the location, a transmission parameter of radar signals configured for transmission by the first radar source to the location.

In some aspects, the quantity and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method performed by a first radar source, comprising:
   transmitting first radar signals;
   receiving, from one or more second radar sources, at least one of second radar signals or radar signal congestion data related to the one or more second radar sources; and
   transmitting third radar signals, wherein at least one transmission parameter of the third radar signals has a first value different from a second value corresponding to at least one transmission parameter of the first radar signals, wherein the at least one transmission parameter of the third radar signals comprises at least one of a transmission power or a chirp length, and wherein a difference between the first value and the second value is based on a first congestion level in a vicinity of the first radar source and a congestion threshold.

2. The method of claim 1, further comprising measuring at least one of an in-band power spectral density or an in-band energy of the second radar signals, wherein:
   the at least one of the measured in-band power spectral density or in-band energy indicate the first congestion level in the vicinity of the first radar source.

3. The method of claim 1, wherein the transmitting third radar signals includes transmitting the third radar signals when the first congestion level exceeds congestion threshold indicating high signal congestion in the vicinity of the first radar source.

4. The method of claim 1, wherein a second transmission parameter of the third radar signals includes.

5. The method of claim 1, wherein the first value of the at least one transmission parameter of the third radar signals is less than the second value of the corresponding at least one transmission parameter of the first radar signals.

6. The method of claim 1, further comprising transmitting fourth radar signals having transmission parameter comprising the second value when a second congestion level in the vicinity of the first radar source falls below the congestion threshold indicating low signal congestion in the vicinity of the first radar source.

7. The method of claim 1, wherein the radar signal congestion data is received from the one or more second radar sources via a sidelink communication link.

8. The method of claim 7, wherein the first radar source is a vehicle and the sidelink communication link is a vehicle-to-vehicle (V2V) communication link, vehicle-to-infrastructure (V2I) communication link, or vehicle-to-everything (V2X) communication link.

9. The method of claim 7, wherein the radar signal congestion data includes information related to one or more of location, mobility, or radar capability of the one or more second radar sources.

10. The method of claim 9, wherein the first congestion level is determined based on the information related to one or more of location, mobility, or radar capability of the one or more second radar sources.

11. An apparatus, comprising:
    a transceiver configured to:
    transmit first radar signals;
    receive, from one or more second radar sources, at least one of second radar signals or radar signal congestion data related to the one or more second radar sources; and
    transmit third radar signals, wherein at least one transmission parameter of the third radar signals has a first value different from a second value corresponding to at least one transmission parameter of the first radar signals, wherein the at least one transmission parameter of the third radar signals comprises at least one of a transmission power or a chirp length, and wherein a difference between the first value and the second value is based on a first congestion level in a vicinity of the first radar source and a congestion threshold.

12. The apparatus of claim 11, further comprising a processor configured to:
    measure at least one of an in-band power spectral density or an in-band energy of the second radar signals, wherein:
    the at least one of the measured in-band power spectral density or the in-band energy indicate the first congestion level in the vicinity of the first radar source.

13. The apparatus of claim 11, wherein the transceiver is configured to transmit the third radar signals when the first congestion level exceeds the congestion threshold indicating high signal congestion in the vicinity of the first radar source.

14. The apparatus of claim 11, wherein a second transmission parameter of the third radar signals includes.

15. The apparatus of claim 11, wherein the first value of the at least one transmission parameter of the third radar signals is less than the second value of the corresponding at least one transmission parameter of the first radar signals.

16. The apparatus of claim 11, wherein the transceiver is further configured to transmit fourth radar signals having transmission parameter comprising the second value when a second congestion level in the vicinity of the first radar source falls below the congestion threshold indicating low signal congestion in the vicinity of the first radar source.

17. The apparatus of claim 11, wherein the radar signal congestion data is received from the one or more second radar sources via a sidelink communication link.

18. The apparatus of claim 17, wherein the first radar source is a vehicle and the sidelink communication link is a vehicle-to-vehicle (V2V) communication link, vehicle-to-infrastructure (V2I) communication link, or vehicle-to-everything (V2X) communication link.

19. The apparatus of claim 17, wherein the radar signal congestion data includes information related to one or more of location, mobility, or radar capability of the one or more second radar sources.

20. The apparatus of claim 19, wherein the first congestion level is determined based on the information related to one or more of location, mobility, or radar capability of the one or more second radar sources.

21. A non-transitory computer-readable medium (CRM) having program code recorded thereon, the program code comprising:
    code for causing a transceiver, associated with a first radar source, to transmit first radar signals;
    code for causing the transceiver to receive, from one or more second radar sources, at least one of second radar signals or radar signal congestion data related to the one or more second radar sources; and code for causing the transceiver to transmit third radar signals, wherein at least one transmission parameter of the third radar signals has a first value different from a second value corresponding to at least one transmission parameter of the first radar signals, wherein the at least one transmission parameter of the third radar signals comprises at least one of a transmission power or a chirp length, and wherein a difference between the first value and the second value is based on a first congestion level in a vicinity of the first radar source and a congestion threshold.

22. The non-transitory CRM of claim 21, wherein the program code further comprises:

code for causing a processor, associated with the first radar source, to measure at least one of an in-band power spectral density or an in-band energy of the second radar signals, wherein:

the at least one of the measured in-band power spectral density or the in-band energy indicate the first congestion level in the vicinity of the first radar source.

23. The non-transitory CRM of claim 21, wherein:

the code for causing the transceiver to transmit the third radar signals includes code for causing the transceiver to transmit the third radar signals when the first congestion level exceeds the congestion threshold indicating high signal congestion in the vicinity of the first radar source.

24. The non-transitory CRM of claim 21, wherein:

wherein a second transmission parameter of the third radar signals includes a frame of the first or third radar signals.

25. The non-transitory CRM of claim 21, wherein the first value of the at least one transmission parameter of the third radar signals is less than the second value of the corresponding at least one transmission parameter of the first radar signals.

26. The non-transitory CRM of claim 21, further comprising code for causing the transceiver to transmit fourth radar signals having transmission parameter comprising the second value when a second congestion level in the vicinity of the first radar source falls below the congestion threshold indicating low signal congestion in the vicinity of the first radar source.

27. The non-transitory CRM of claim 21, wherein the radar signal congestion data is received from the one or more second radar sources via a sidelink communication link.

28. The non-transitory CRM of claim 27, wherein the first radar source is a vehicle and the sidelink communication link is a vehicle-to-vehicle (V2V) communication link, vehicle-to-infrastructure (V2I) communication link, or vehicle-to-everything (V2X) communication link.

29. The non-transitory CRM of claim 27, wherein the radar signal congestion data includes information related to one or more of location, mobility, or radar capability of the one or more second radar sources.

30. The non-transitory CRM of claim 29, wherein the first congestion level is determined based on the information related to one or more of location, mobility, or radar capability of the one or more second radar sources.

* * * * *